United States Patent
Holtzman et al.

(10) Patent No.: US 6,326,565 B1
(45) Date of Patent: *Dec. 4, 2001

(54) MARKING DEVICE FOR ELECTRONIC PRESENTATION BOARD

(75) Inventors: Rafi Holtzman, San Mateo, CA (US); Isaac Zloter, Tel Aviv (IL)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/808,570

(22) Filed: Feb. 28, 1997

(Under 37 CFR 1.47)

(51) Int. Cl.⁷ .................................................. G08C 21/00
(52) U.S. Cl. .................................... 178/19.01; 178/19.03; 178/19.04
(58) Field of Search .................................... 345/179, 180; 178/19.01, 19.02, 19.03, 19.04, 19.05

(56) References Cited

U.S. PATENT DOCUMENTS

| Re. 33,936 | 5/1992 | Miyamori et al. ...................... 178/18 |
| 3,134,099 | 5/1964 | Woo . | |

(List continued on next page.)

FOREIGN PATENT DOCUMENTS

| 0 169 53B | 1/1986 | (EP) | G06K/11/06 |
| 0 229 637 | 7/1987 | (EP) | G06K/11/06 |
| 2 698 191 | 5/1994 | (FR) | G06F/15/66 |
| WO 98/37508 | 8/1998 | (WO) . | |
| WO 98/38595 | 9/1998 | (WO) . | |
| WO 98/38596 | 9/1998 | (WO) . | |
| WO 98/39729 | 9/1998 | (WO) . | |
| WO 98/40838 | 9/1998 | (WO) . | |

OTHER PUBLICATIONS

"Radar On A Chip," Popular Science, Mar. 1996.
"Micropower Impulse Radar (MIR) Technology Overview," htt;://lasers.llnl.gov/lasers/idp/mir/files/MIR_info.ht (1996).
advertisement by Wacom, 1996.
advertisement by Calcomp, 1996.

* cited by examiner

Primary Examiner—Vijay Shankar
(74) Attorney, Agent, or Firm—Michael A. Glenn

(57) ABSTRACT

A transmitter device is disclosed for use with a conventional pen in which the ultrasound transmitter is a cylindrical element lying coaxial with the pen and adjacent to its tip, and a jointed eraser structure. Conventional triangulation techniques are used to track the position and motion of a writer or eraser. An encoding facility associated with the pen provides the ability to distinguish whether the pen is used for marking or an as erasing implement, as well as determining the nature or character of written line width or eraser swath. A data stream thus generated can be used in a variety of ways, such as for example, to feed information into the memory of a digital computer, and/or to feed information for transmission to remote stations.

4 Claims, 6 Drawing Sheets

U.S. PATENT DOCUMENTS

| | | | |
|---|---|---|---|
| 3,382,480 | 5/1968 | Tsao et al. | |
| 3,396,366 | 8/1968 | Midlock et al. | |
| 3,613,066 | 10/1971 | Cacreman | 340/347 |
| 3,706,850 | 12/1972 | Fisher et al. | 178/18 |
| 3,731,273 | 5/1973 | Hunt | 340/16 |
| 3,838,212 | 9/1974 | Whetstone et al. | 179/18 |
| 3,914,754 | 10/1975 | Kirk | 340/267 |
| 4,012,588 | 3/1977 | Davis et al. | 178/18 |
| 4,103,278 | 7/1978 | Satake et al. | 340/1 R |
| 4,246,439 * | 1/1981 | Romein | 178/19.01 |
| 4,307,456 | 12/1981 | Ise et al. | 367/900 |
| 4,309,098 | 1/1982 | Shenk | 354/25 |
| 4,317,005 | 2/1982 | de Bruyne | 178/19 |
| 4,336,987 | 6/1982 | Shenk | 354/195 |
| 4,357,672 | 11/1982 | Howells et al. | 364/561 |
| 4,439,846 | 3/1984 | Rodriguez | 367/99 |
| 4,440,482 | 4/1984 | Shenk | 354/195.1 |
| 4,488,000 | 12/1984 | Glenn | 178/18 |
| 4,490,814 | 12/1984 | Shenk | 367/140 |
| 4,506,354 | 3/1985 | Hansen | 367/101 |
| 4,552,991 | 11/1985 | Hulls | 178/18 |
| 4,564,928 | 1/1986 | Glenn et al. | 367/117 |
| 4,570,033 | 2/1986 | Hulls | 178/19 |
| 4,578,674 | 3/1986 | Baker et al. | 340/710 |
| 4,654,648 | 3/1987 | Herrington et al. | 340/710 |
| 4,665,282 | 5/1987 | Sato et al. | 178/18 |
| 4,670,751 | 6/1987 | Enokido et al. | 340/706 |
| 4,677,595 | 6/1987 | Obayashi et al. | 367/13 |
| 4,682,159 | 7/1987 | Davison | 340/709 |
| 4,695,833 | 9/1987 | Ogura et al. | 340/722 |
| 4,711,977 | 12/1987 | Miyamori et al. | 178/18 |
| 4,739,860 | 4/1988 | Kobayashi et al. | 181/123 |
| 4,750,584 | 6/1988 | Tanaka et al. | 181/123 |
| 4,758,691 | 7/1988 | de Bruyne | 178/19 |
| 4,772,764 | 9/1988 | Dorr | 178/18 |
| 4,777,329 * | 10/1988 | Mallico et al. | 345/179 |
| 4,796,726 | 1/1989 | Kobayashi | 181/123 |
| 4,814,552 * | 3/1989 | Stefik et al. | 345/179 |
| 4,827,410 | 5/1989 | Corren | 364/200 |
| 4,829,492 | 5/1989 | Choi et al. | 367/110 |
| 4,845,684 | 7/1989 | Garwin et al. | 367/137 |
| 4,853,715 | 8/1989 | Paschkis | 346/139 |
| 4,862,152 | 8/1989 | Milner | 340/712 |
| 4,963,703 | 10/1990 | Phillips et al. | 178/19 |
| 4,988,981 | 1/1991 | Zimmerman et al. | 340/709 |
| 4,991,148 | 2/1991 | Gilchrist | 367/124 |
| 5,017,913 | 5/1991 | Kaneko et al. | 340/712 |
| 5,023,408 | 6/1991 | Murakami et al. | 178/19 |
| 5,043,950 | 8/1991 | Schorum et al. | 367/98 |
| 5,050,134 | 9/1991 | Butler | 367/118 |
| 5,107,746 | 4/1992 | Bauer | 84/626 |
| 5,142,506 | 8/1992 | Edwards | 367/127 |
| 5,144,594 | 9/1992 | Gilchrist | 367/129 |
| 5,182,585 | 1/1993 | Stoner | 351/41 |
| 5,214,615 | 5/1993 | Bauer | 367/128 |
| 5,226,320 | 7/1993 | Dages et al. | 73/290 |
| 5,229,975 | 7/1993 | Truesdell et al. | 367/107 |
| 5,231,381 | 7/1993 | Duwaer | 340/712 |
| 5,239,139 | 8/1993 | Zuta | 178/18 |
| 5,248,856 | 9/1993 | Mallicoat | 178/18 |
| 5,280,457 | 1/1994 | Figueroa et al. | 367/127 |
| 5,308,936 | 5/1994 | Biggs et al. | 178/18 |
| 5,379,269 | 1/1995 | Sindeband et al. | 367/127 |
| 5,434,370 | 7/1995 | Wilson et al. | 178/18 |
| 5,448,263 | 9/1995 | Martia | 345/173 |
| 5,500,492 | 3/1996 | Kobayashi et al. | 178/18 |
| 5,557,301 | 9/1996 | D'Aviau de Piolant | 345/179 |
| 5,691,959 | 11/1997 | Kriewall et al. | 367/129 |

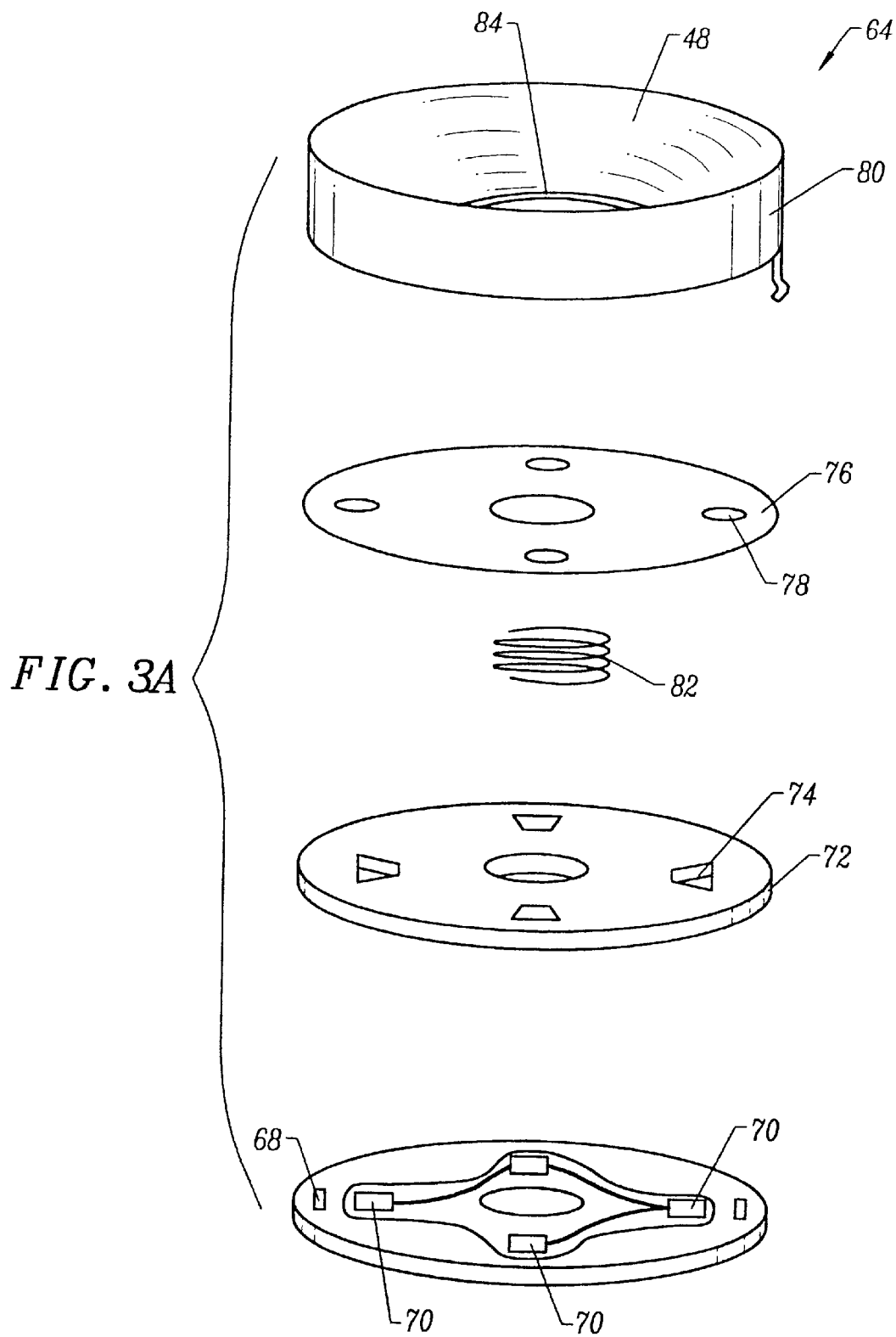

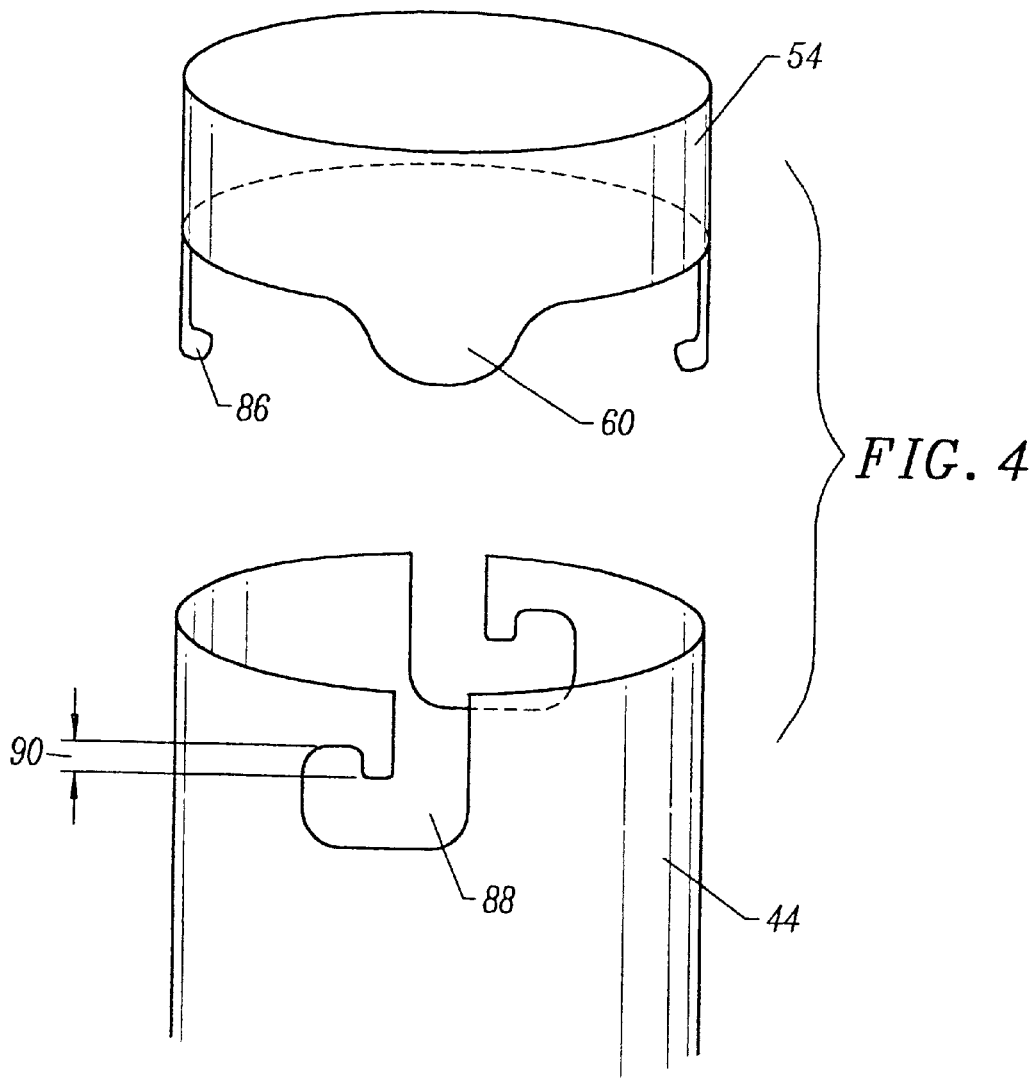

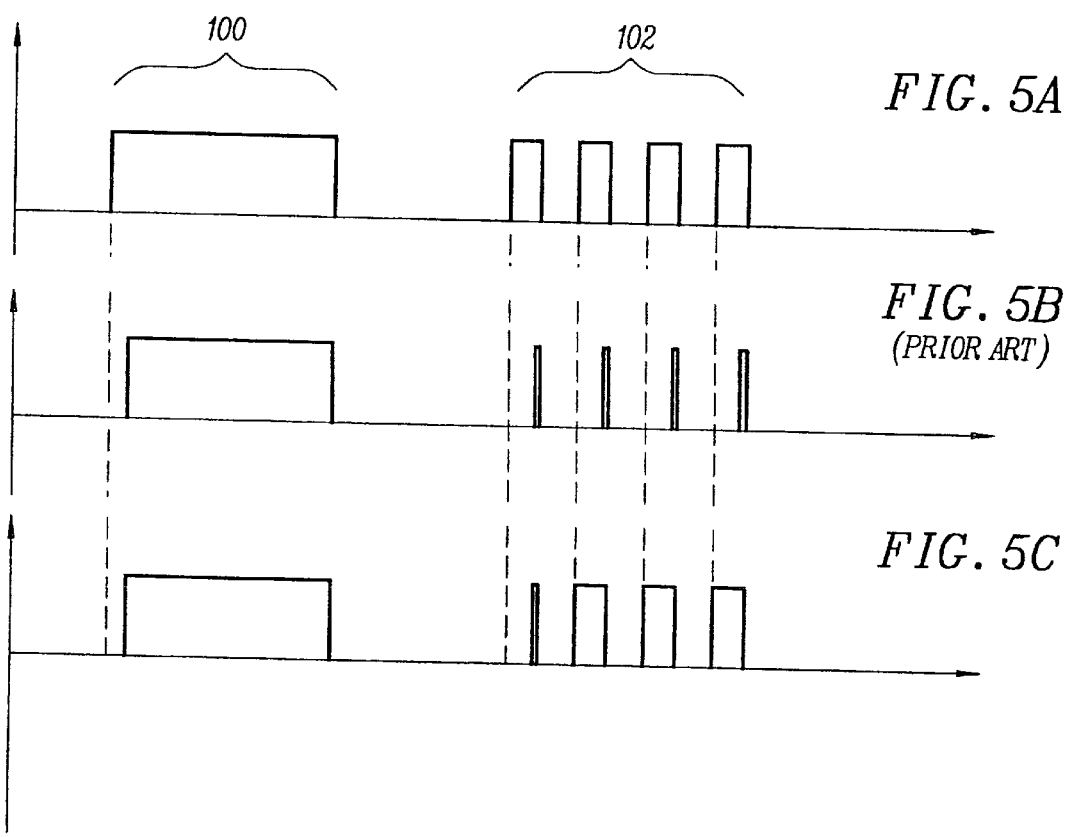

MARKING DEVICE FOR ELECTRONIC PRESENTATION BOARD

BACKGROUND OF THE INVENTION

1. Technical Field

The invention relates to an electronic presentation board. More particularly, the invention concerns devices for use with conventional presentation boards and pens for digitizing lines drawn manually.

2. Description of the Prior Art

It is known to use various techniques for determining the position of a writing implement or stylus on a flat surface. U.S. Pat. No. 4,564,928 to Glenn et al., U.S. Pat. No. 4,886,943 to Suzuki et al., U.S. Pat. Nos. 4,910,363 and 5,073,685 to Kobayashi et al. and U.S. Pat. No. 5,097,102 to Yoshimura et al. all disclose systems in which a vibrating element associated with a pen transmits vibrations through the material of a board. The vibrations are detected by transducers attached to the board and the position of the pen is calculated from the transmission time of the vibrations through the board. These systems inherently function exclusively when the pen is in contract with the board such that vibrations are transferred to the board. As a result, no special mechanism is required to distinguish writing from non-writing pen movements.

These systems typically require highly specialized board structures which renders them expensive and inconvenient.

An alternative approach is the use of airborne ultrasound signals. Examples of such systems are described in U.S. Pat. No. 4,777,329 to Mallicoat, U.S. Pat. No. 4,814,552 to Stefik et al., U.S. Pat. No. 4,506,354 to Hansen and U.S. Pat. No. 1,758,691 to De Bruyne. These systems employ various combinations of ultrasound transmitters and receivers arranged at two points fixed relative to a board and on a movable writing implement. The position of the movable implement is then derived by triangulation. The systems typically require an additional hard-wired or electromagnetic link between the movable implement and a base unit to provide timing information for time-of-flight ultrasound calculations. An additional switch is also required to identify when the movable element is in contact with the board.

These systems are typically limited to relatively small boards. This is because of signal to noise ration (SNR) limitations. The volume of ultrasound used cannot be very high without causing bothersome accompanying whistling noises. Additionally, in a wireless system, power considerations severely limit the transmitted volume. To generate reliable position information, the transmitter-to-receiver distance must therefore be kept small. Attempts to use different sets of receivers for different regions of a large board generally result in discontinuities when the movable element travels from one region to another.

Another shortcoming of these systems is their inability to reproduce rapid interrupted pen strokes such as performed when drawing a dashed line. Typically, the transmitter or receiver element in the pen turns off when the pen is inactive and is re-activated each time the pen comes in contact with the board. The system then takes a fraction of a second to resynchronize before it responds correctly. In the case of short strokes, the length of the operative stroke may be comparable with the response time of the system, thereby giving very poor results.

An additional problem of the airborne ultrasound digitizer systems is that the ultrasound transmitter or receiver element is mounted asymmetrically to the side of the drawing implement. As a result, the measured position is offset from the true drawing position in a direction which changes with rotation of the drawing implement. This may result in discontinuities and illegible writing in the digitized images when the drawing implement position is changed between strokes.

Finally, conventional presentation board digitizer systems are typically limited to use with specially produced writing implements. This renders them expensive since pens have a very limited lifetime. Even where the ink cartridge is separately replaceable, the components used must be of a very specific design to be compatible.

There is therefore a need for a reliable, low cost, digitizer system which may be used with conventional presentation boards of all sizes for determining accurately the position of a drawing implement on the board. It would also be advantageous to have a transmitter device for use with presentation board which can be used with a wide range of conventional writing implements.

SUMMARY OF THE INVENTION

The invention provides an electronic presentation board for use with presentation boards of all sizes. The presentation board includes a digitizer system for digitizing operative strokes of a drawing implement carrying a transmitter against the board. The preferred system includes at least two receivers mounted relative to the board for receiving airborne signals. A processor responsive to outputs from said at least two receivers calculates a current position of the transmitter, said processor being additionally responsive to identify contact between the drawing implement and the board, thereby identifying operative strokes of the drawing implement.

An alternative embodiment of the invention provides a transmitter device for use with a system for digitizing operative strokes of a hand held drawing implement. In this embodiment of the invention, the drawing implement has a body and an operative tip. The transmitter device includes a housing having a substantially cylindrical opening terminating at a first end in an annular wedge surface with a central bore. The housing receives a portion of the body of the drawing implement with its operative tip extending from the central bore. The device also includes a retainer that is attachable to a second end of the opening to retain the drawing implement within the housing. The retainer has a spring element for biasing the drawing implement towards the annular wedge surface. A transmitter is mounted relative to the housing proximal to the central bore.

BRIEF DESCRIPTION OF THE DRAWINGS

FIG. 3A is an exploded perspective view of a microswitch structure, constructed and operative according to the invention, for use in the transmitter device of FIG. 2;

FIG. 4 is a schematic perspective view of a preferred structure for attachment of a retaining member to a housing for use in the transmitter device of FIG. 2;

FIG. 5A is a plot of the output of a contact switch activated by operational contact between a drawing implement and a presentation board as a function of time;

FIG. 5B illustrates the recorded drawing implement operation time profile produced by prior art systems corresponding to the contact profile of FIG. 3A;

FIG. 5C illustrates the corresponding recorded drawing implement operation time profile produced according to a first embodiment of a presentation board digitizer system, constructed and operative according to the invention.

DETAILED DESCRIPTION OF THE PREFERRED EMBODIMENT

The invention provides a presentation board digitizer system for use with presentation boards of all sizes and which may be used with replaceable conventional pen elements.

Figure 1:
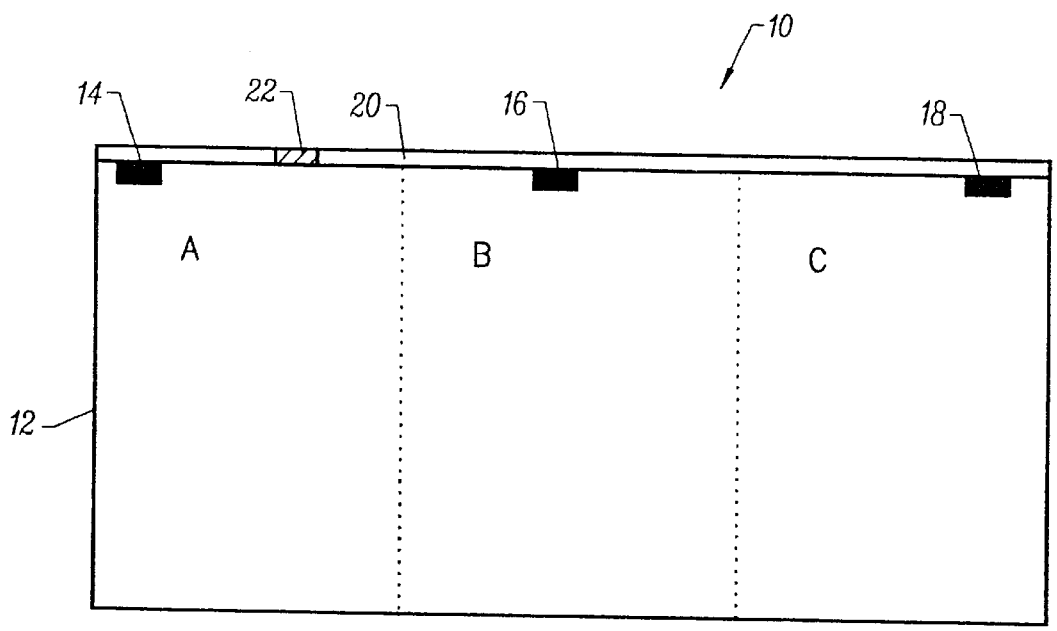
FIG. 1 is a schematic front view of a presentation board according to the invention.

FIG. 1 shows a presentation board digitizer system, generally designated 10, constructed and operative according to the invention. System 10 features a presentation board 12, which may be of any conventional type, provided with a plurality of receiver assemblies 14, 16, and 18. The receiver assemblies 14, 16, and 18 are preferably mounted in a strip 20 adapted for convenient attachment to presentation boards of different sizes and thicknesses. This attachment may be achieved through clamps or clips of any type (see, for example, commonly assigned and copending patent application Ser. No. 08/804,497, filed Feb. 21, 1997 (Retrofittable Apparatus For Converting A Substantially Planar Surface Into An Electronic Data Capture Device). Strip 20 also features a receiver 22. The present position of the movable element is derived from the time-of-flight (TOF) of signals from the movable element to the receiver assemblies by triangulation. An additional signal provides information such as, for example, the color of a pen being used.

In principle, two receivers are sufficient to determine the position of a movable element in contact with board 12. However, to provide reliable reception over the entire area of a large board, system 10 employs more than one set of receivers. Thus, in the system as illustrated, a first set of receivers is defined as the pair of receiver assemblies 14 and 16, and a second set of receivers is defined as the pair of receiver assemblies 16 and 18. The first set of receivers so defined is positioned for receiving a signal from the transmitter when the movable element is in a first region denoted A, and the second set of receivers is positioned for receiving the signal when the movable element is in a second region denoted C. Thus, optimal precision and reliability is achieved by deriving the position of the movable element from the outputs of receiver assemblies 14 and 16 when the movable element is in region A, and from the outputs of receiver assemblies 16 and 18 when the movable element is in region C. It should be appreciated that other position detection schemes may be used in connection with practice of the herein disclosed invention.

Figure 2:
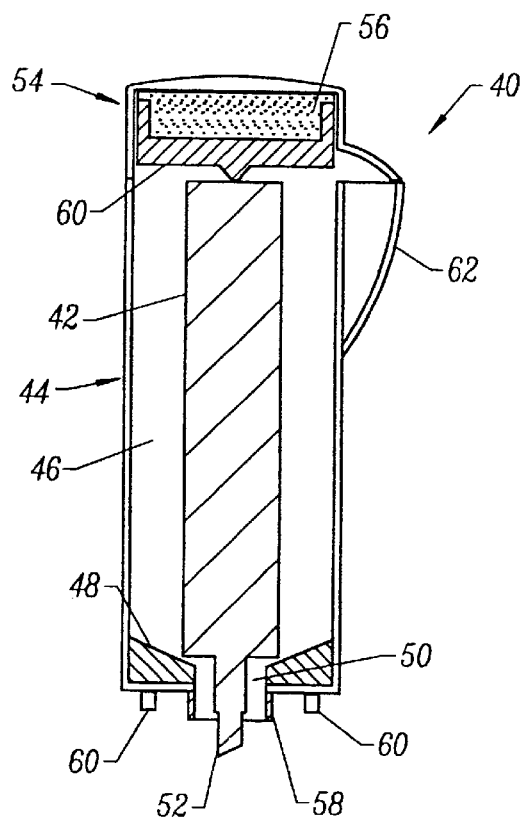
FIG. 2 is a side cross sectional view of a transmitter device, constructed and operative according to the invention, used with a conventional drawing implement in a digitizer system.
Figure 3B:
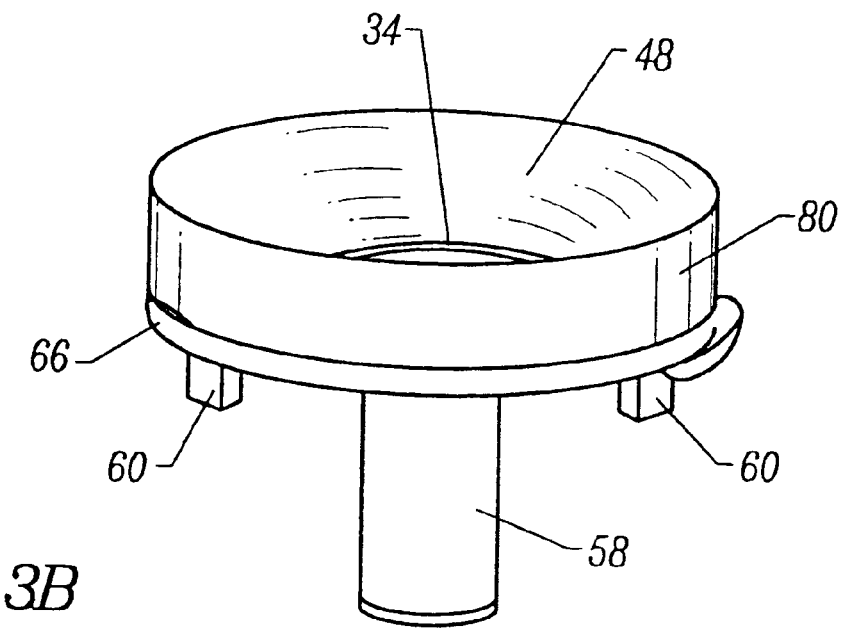
FIG. 3B is a perspective view of the microswitch structure of FIG. 3A assembled.
Figure 3C:
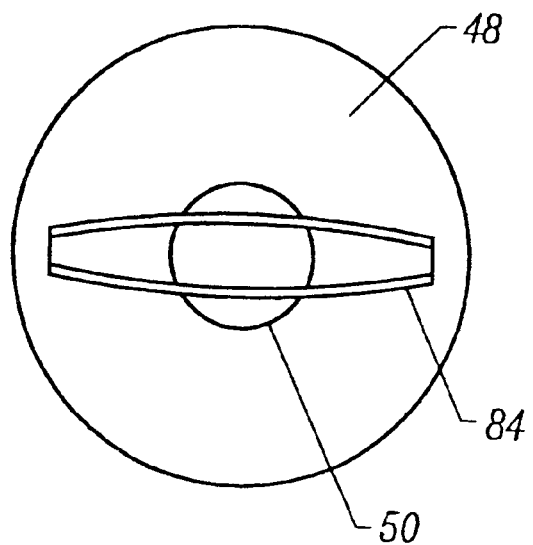
FIG. 3C is a top view of the microswitch structure of FIG. 3A showing a retaining spring arrangement.

FIGS. 2–4 show a preferred embodiment of a transmitter device, generally designated 40, constructed and operative according to the invention, for use with a drawing implement 42 in a digitizer system. Transmitter device 40 may be used to advantage with a wide range of digitizer systems including, but not limited to, the presentation board digitizer systems described above.

Generally speaking, transmitter device 40 includes a housing 44 having a substantially cylindrical opening 46 which terminates at its lower end in an annular wedge surface 48 having a central box 50. Drawing implement 42 is received within opening 46 with its operative tip 52 extending through bore 50.

Transmitter device 40 also includes a retainer 54 in the form of a cover attachable to the upper end of opening 46 to retain drawing implement 42 in position within housing 44. Retainer 54 features a spring element 56 for biasing drawing 42 towards annular wedge surface 48. A transmitter 58 is mounted on the lower surface of housing 44 proximal to bore 50.

It is a particular feature of preferred embodiments of the transmitter device that they can accommodate drawing implements of a range of lengths and widths. To this end, spring element 56 adjusts to any variations in length, and biases drawing implement 42 towards the lower end of housing 44 to ensure a correct position for use. This biasing, in conjunction with the shape of annular wedge surface 48, serves to center the front end of a drawing implement of any size or shape. In addition, spring element 56 is preferably provided with a shaped abutment surface 60 having features for centering the back end of a drawing implement. Typically, abutment surface 60 has an axial conical projection as shown for centering drawing implements by engaging a rear axial recess which is common to almost all presentation board pens. Alternatively, abutment surface 60 maybe be formed with a conical recess or other features for centering the back of a drawing implement.

It should be noted that the combination of annual wedge surface 48 and spring element 56 with abutment surface 60 serves to hold drawing implements of a range of lengths and widths in central alignment within cylindrical opening 46 without contacting the sides of housing 44. This arrangement makes transmitter device 40 insensitive to variations in drawing implement width. The avoidance of frictional contact with the sides of housing 44 is also important for efficient operation of a contact sensing microswitch, as is described below.

FIG. 5A is a plot of the output of a contact switch activated by operational contact between a drawing implement and a presentation board as a function of time. FIG. 5A shows a drawing stroke period 100 for a continuous line segment, as well as individual stroke periods 102 for a dashed line. FIG. 5B illustrates the recorded drawing implement operation time profile produced by prior art systems corresponding to the contact profile of FIG. 3A. It can be seen that for the continuous line segment (period 100), the effects of signal loss (shown by the dashed line) are not sufficient to interfere with tracking of the line. Thus, there is a small signal loss at the beginning of the period, but the majority of the stroke is recorded well. However, during period 102 the system response time is comparable to the length of the pen strokes. As a result, the dashed line is almost completely lost.

The preferred embodiment of the invention solves the foregoing problem by maintaining synchronization between the transmitter device 40 and the receiver system for a given period of time after the end of each pen stroke. This may be achieved, for example, by the use of electronic circuitry that continues to operate the transmitter 60 for a given time interval after the microswitch 64 ceases to indicate a force exerted on the other housing towards the operative tip of the drawing implement. False drawings signals are avoided by either disabling the transmitter 58 during the delay period, or by changing the content of the signal to indicate a noncontact pen state. The delay period is typically from about ½ second, and preferably between 1 and about 2 seconds, in duration.

FIG. 5C illustrates the corresponding recorded drawing implement operation time profile produced according to a first embodiment of a presentation board digitizer system, constructed and operative according to the invention. FIG. 5C shows the response profile of the transmitter device 40 as described. During an initial period of a single pen stroke, the response curve is similar to that shown on FIG. 5B for the prior art. However, when short repeated strokes are encountered, the transmitter device 40 maintains synchronization between successive strokes, thereby providing an accurate response immediately on switching of the microswitch 64.

Figure 6:
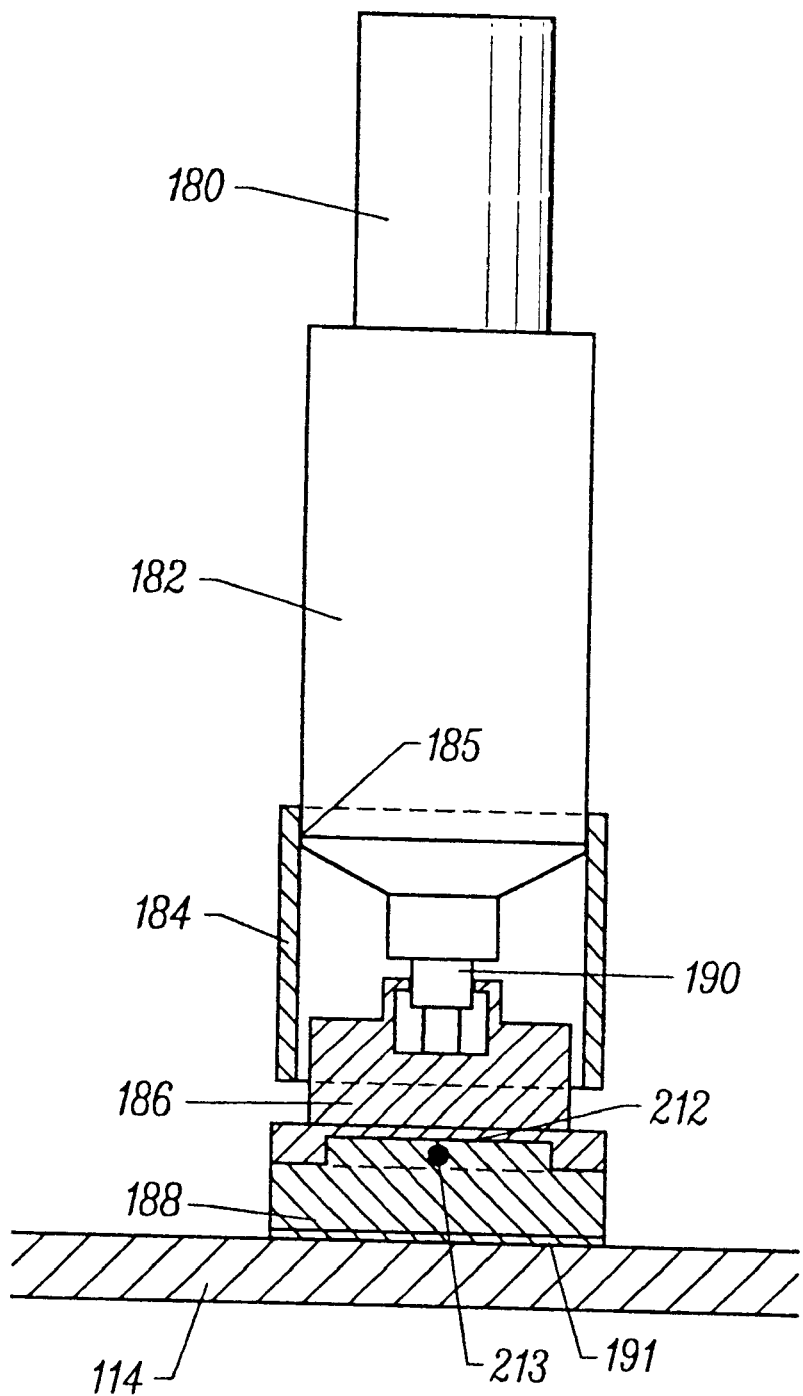
FIG. 6 is a side cross sectional view of an eraser transmitter unit, constructed and operative according to the invention, for use with a digitizer system.

FIG. 6 is a side cross sectional view of an eraser transmitter unit, constructed and operative according to the invention, for use with a digitizer system. While various multifunction writing implements have been identified above in connection with the prior art, it is thought that such devices are somewhat limited in their ability to operate in connection with various tracking schemes. Thus, some such implements are especially designed for optical schemes, while other implements are especially designed for electromagnetic tracking schemes. A major problem with eraser elements for use with digitizer systems is the common practice of employing only a part of the eraser surface. Because the digitizer is typically unable to distinguish between flat contact and edge contact of the eraser, the digitized image frequently shows a much greater erased area than has actually been cleared from the presentation board itself. To solve this problem, the invention provides an eraser that is constructed such that the eraser surface is self-orienting to lie parallel to the presentation board surface. This ensures that the contact area of the eraser element is always precisely defined.

The implement shown on FIG. 6 may be used for several purposes. Thus, the implement includes a sleeve 182 that comprises a handle, and an eraser 188, which has a substantially flat, eraser surface 191. The eraser surface is preferably circular. The handle and eraser may be connected by a pivot joint 212, which may be a ball and socket having two degrees of rotational freedom. The pivot joint ensures that the eraser assumes an orientation with the eraser surface 191 parallel to the presentation board surface substantially independent of the orientation of the handle. Connection of the handle to the pivot joint is through a spring assembly 213. The implement also includes a transmitter similar to the transmitter 40 discussed above. A pressure sensing microswitch 190 is mounted to sense contact pressure between the handle and the eraser and operate the transmitter accordingly.

The writing implement shown on FIG. 6 provides a sleeve 182 that has an inner diameter that is adapted to receive and securely retain a standard dry erase marker 180. Thus, one using the herein disclosed marking implement uses a marker that is familiar. The sleeve is tapered to follow the tapered contour of the pen and terminates with a switch 190 that detects movement of the pen tip, i.e. when the tip of the pen is placed to the writing surface. Such detection generates a signal that is communicated to the sensor array to indicate that the marking implement is now in contact with the writing surface (and not above the writing surface, as such detection would provide a false plane of information to the sensor array). Thus, the sensor array only tracks marking implement position when the marking implement is registered to the writing surface. Such signal may also communicate actual positional information, for example by providing a relay or feedback of tracking information received at the pen, such that a time based marking implement position may be derived.

Such signal may also be modulated or digitally coded to identify a particular marking implement function or color, for example whether the marking implement is a red or blue pen, whether the marking implement is drawing a thin line or a thick line, or whether the marking implement is an eraser. In connection with this last point, the marking implement herein disclosed includes a collar 184 that is adapted to be securely fitted to the sleeve 182. The collar activates a switch 185 that indicates it is fitted to the sleeve. A plunger 186 is movable fitted within the collar. An eraser 188 is securely received within the plunger.

In operation, the eraser is pressed to the writing surface to erase marking thereon. This action pushes the plunger into the collar, thereby activating the switch 190, and thereby indicating contact of the eraser with the writing surface. The presence of the collar operates the switch 185, thereby indicating that the marking implement is performing an eraser function. With regard to the actual determination of the position of the marking implement, the invention is readily adapted for use with any modern locating technique, including any of those techniques discussed above in connection with the prior art.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A transmitter device for use with a system for digitizing operative strokes of a handheld drawing implement, the drawing implement having a body and an operative tip, the transmitter device comprising:

a housing;

a transmitter mounted relative to said housing;

a microswitch that is responsive to a force exerted on the operative tip of the drawing implement towards said housing;

electronic circuitry responsive to said microswitch to affect operation of said transmitter, wherein said electronic circuitry operates said transmitter for a given time interval after said microswitch ceases to indicate a force exerted on said housing towards the operative tip of the drawing implement.

2. The device of claim 1, wherein said given time interval is at least about half a second.

3. The device of claim 1, whereby said transmitter transmits continuously, and wherein said electronic circuitry is responsive to said microswitch to change a signal transmitted by said transmitter while said microswitch indicates a force exerted on the operative tip of the drawing implement towards said housing.

4. The device of claim 1 for use with a system for digitizing the position of a handheld drawing implement, said drawing implement having a central axis and an operative tip, said transmitter device further comprising:

a substantially cylindrical transmitter element positioned coaxially with the drawing implement so as to circumscribe a part of the drawing implement proximal to said operative tip.

\* \* \* \* \*